United States Patent [19]

Wiebe

[11] E Patent Number: Re. 31,988

[45] Reissued Date of Patent: Sep. 24, 1985

[54] RAILWAY TRUCK BOLSTER FRICTION ASSEMBLY

[75] Inventor: Donald Wiebe, Sewickley, Pa.

[73] Assignee: A. Stucki Company, Pittsburgh, Pa.

[21] Appl. No.: 502,423

[22] Filed: Jun. 8, 1983

Related U.S. Patent Documents

Reissue of:

[64] Patent No.: 4,295,429
Issued: Oct. 20, 1981
Appl. No.: 133,268
Filed: Mar. 24, 1980

[51] Int. Cl.[4] ..... B60F 3/00

[52] U.S. Cl. ..... 105/197 DB; 105/197 D

[58] Field of Search ..... 105/197 A, 197 D, 197 DB, 105/224.1, 224 R; 280/716; 267/9 R, 9 A, 9 B, 63 R, 140, 141

[56] References Cited

U.S. PATENT DOCUMENTS

| | | | |
|---|---|---|---|
| 2,250,568 | 7/1941 | Borup | 105/224.1 |
| 2,259,049 | 10/1941 | Swan et al. | 105/197 A |
| 2,434,838 | 1/1948 | Cottrell | 105/197 DB |
| 2,564,771 | 8/1951 | Spence | 105/197 D |
| 2,767,860 | 10/1956 | Fillion | 267/63 R |
| 3,358,614 | 12/1967 | Barber | 105/197 DB |
| 3,461,815 | 8/1969 | Gedris et al. | 267/4 |
| 3,687,086 | 8/1972 | Barber | 105/197 DB |
| 3,714,905 | 2/1973 | Barber | 105/197 DB |
| 3,868,912 | 3/1975 | Wagner et al. | 105/197 DH |
| 4,004,525 | 1/1977 | Wiebe et al. | 105/197 DH |
| 4,080,016 | 3/1978 | Wiebe | 105/199 CB |
| 4,230,047 | 10/1980 | Wiebe | 105/197 DB |

FOREIGN PATENT DOCUMENTS

| | | | |
|---|---|---|---|
| 802602 | 12/1968 | Canada | 105/197 A |

OTHER PUBLICATIONS

Progressive Railroading, Sep. 1979, "Friction Wedge Attacks Hunting".

ASME Publication No. 79-WA/RT-14, "Truck Hunting on a Three-Piece Freight Car Truck".

Advertising Brochure titled "Railroad Dynamics, Inc."

*Primary Examiner*—Richard A. Bertsch

*Attorney, Agent, or Firm*—Carothers & Carothers

[57] ABSTRACT

A railway freight truck bolster friction assembly and more particularly improved friction assemblies of elastomeric material which are adapted to be captively retained intermediate an axial end portion of a bolster member and an adjacent side frame.

18 Claims, 6 Drawing Figures

RAILWAY TRUCK BOLSTER FRICTION ASSEMBLY

Matter enclosed in heavy brackets [ ] appears in the original patent but forms no part of this reissue specification; matter printed in italics indicates the additions made by reissue.

A railway freight truck bolster friction assembly and more particularly improved friction assemblies of elastomeric material which are adapted to be captively retained intermediate an axial end portion of a bolster member and an adjacent side frame.

Modern three-piece railway freight car trucks use rigid wedge shaped friction members intermediate an axial end portion of the bolster member and an adjacent side frame. These friction members provided the fit-up between the bolster and the side frame columns and serve to snub or damp the freight car suspension.

In the normal travel of railway cars over a railbed, various differences in the surface profile of the laterally spaced tracks resulting from rail joints and superelevation of the outside track on curves, gives rise to a tendency of resonant swaying and bouncing of the car body. In modern cars with heavy load capacity and a relatively high center of gravity, the forces and weight shift of the car resulting from track surface variations becomes so large at times that a variety of effects may develop such as:

(1) Complete unloading of the wheels on one side of the truck to the extent of lifting the unloaded wheels off the rail with a high potential of derailments;

(2) The imposition of extreme stresses on the car body and truck members; and (3) Cumulative damage and misalignment of track, ties and roadbeds through pounding action.

The need for adequate damping of railway vehicle suspensions has been recognized and to a certain extent alleviated by independent means. Specifically, as mentioned hereinabove, rigid friction members, for example as illustrated in U.S. Pat. No. 3,461,815 are generally utilized to dampen or snub the rocking motion by frictional resistance developed between the rigid friction members and the side frame column guides. In addition to the friction members highly successful hydraulic snubbers, such as shown in U.S. Pat. Nos. 4,004,525 and 3,868,912, which are vertically disposed in a spring group, have been developed and provide an even more effective means of snubbing the freight car swaying and bounce.

The utilization of rigid friction members for swaying has been shown to be defective in several areas. For example: the steel on steel frictional engagement between the rigid friction member and the side frame column guide wear plate results in a "stick-slip" friction action which produces poor ride quality. Furthermore, with an empty car the transmissability of the "stick-slip" friction can result in an excitation or coupling with any or all of the natural frequencies of the railway car components; and the "stick-slip" friction action results in an impacting type start and stop movement of the bolster with respect to the side frames thus leading to potential deleterious structural effect. Furthermore, the friction forces on the mating faces of the rigid friction member with respect to the side frame column guide and the bolster pockets may result in a requirement for frequent replacement of components and/or a renewal of wear surfaces. Still further, with the higher friction forces of some rigid friction members the railway trucks occasionally have a tendency to seize in a random lozenged angle (i.e., truck going out of square and the wheel flanges take an acute angle with respect to the guiding rail) thereby increasing unsymmetrical wheel flange and/or tread wear.

The above-mentioned problems have been recognized by the Applicant and overcome, or in the least, greatly alleviated in his invention described in co-pending U.S. patent application Ser. No. 953,012 which was filed on Oct. 20, 1978, now U.S. Pat. No. 4,230,047, and is assigned to the same assignee as is this invention. In this [copending Application] *U.S. Pat. No. 4,230,047* an elastomeric friction member is provided which deforms initially before slipping with respect to the side frame column guide wear plate. Further, (just as a pencil eraser drawn across a rigid surface will initially deform, thereafter have portions slip while other mating portions deform and thereafter slip in its entirety) portions of the surface of the elastomeric friction member will slip while other portions will initially deform. Thus the transition of the elastomeric friction member from rest to movement will be smooth and controlled. With an elastomer, such as urethane there initially occurs motion without friction *sliding* through the deformation of the elastomer and then the friction breaks for a very smooth transition. Furthermore, the relatively soft interface of the elastomeric friction member with respect to the rigid mating surfaces results in substantially less wear and failure due to loosening of column wear plates and of adjacent components and surfaces. Still further, the tendency to freeze in a lozenged attitude is substantially reduced with elastomeric friction members because of the characteristic shear flexibility of elastomers.

Thus by using elastomeric friction members, control of the various loaded and empty railway freight car motion modes is much superior than with the rigid friction members utilized heretofore. Furthermore, the function of spring group hydraulic snubber assemblies will complement the elastomeric friction members resulting in a less nearly linear spring motion response to all truck inputs with more total energy dissipation by the damping combination and less energy transmission to the car body in both loaded and empty operational modes. Still further, if desired, the hydraulic snubbers, which have been found to be operative to furnish more linear and optimum damping may be utilized as substantially the sole snubbing means and the elastomeric friction member will then serve the primary purpose of maintaining the bolster to side frame fit-up relationship. In this latter instance the force levels of the friction member with respect to the side frame column can be reduced to move optimum friction levels along with more optimum shear deformation constants.

The elastomeric friction members of [U.S. patent application Ser. No. 953,012, now] U.S. Pat. No. 4,230,047, also offered a limited controlled lateral restraint between the car body and truck. This limited controlled lateral restraint tends to increase the threshold primary hunting speed of railway vehicles.

Hunting in railway vehicles is the unstable cyclic yawing of trucks and the resulting lateral oscillation of the railway car vehicle and is of particular significance when the car is traveling in an empty condition at relatively high speeds; for example, in excess of 40 miles per hour. The lateral track irregularities combined with conventional coned wheel configurations results in one side of a wheel set moving ahead of the other which in turn results in the flanges of the wheels striking and rubbing against the rails first on one side and then on the other thereby causing undesirable lateral body oscillations and excessive truck component and rail wear. As the wheel treads and flanges wear, the tread conicity becomes more severe and the flange-rail clearance becomes larger thereby resulting in even greater excursions of the wheel sets during hunting and hence a more severe response occurs at an even lower speed. The lateral excursions can become effectively severe to possibly result in derailments.

The inclusion of an elastomeric friction member, as illustrated in [application Ser. No. 953,012,] *U.S. Pat. No. 4,230,047* provides a controlled lateral constraint by increasing the laterial spring constant. The lateral spring constant of the elastomer is added to the lateral spring constant of the spring group, thus increasing the threshold hunting speed in much the same manner as the elastomeric bearing blocks of the side bearing in Applicant's U.S. Pat. No. 4,080,016. For example, the resonance frequency due to hunting with rigid friction members may be 1½ to 2 hertz; however, the inclusion of the elastomeric friction members of [application Ser. No. 953,012, now] U.S. Pat. No. 4,230,047, may drive this resonance frequency to 2½ to 3 hertz, or even higher. Thus, in some instances it may be possible to adequately control hunting by the inclusion of such elastomeric friction members without the necessity of having elastomeric bearing blocks being disposed within the side bearings. In the least, the lateral spring constant provided by such elastomeric friction members will permit a wider range of choices as to the composition of the side bearing elastomeric bearing blocks.

The elastomeric friction wedge described in U.S. Pat. [Application Ser. No. 953,012] *No. 4,230,047* has proved to be a significant advance over the prior art friction wedges; however, in certain instances, the lateral constraint qualities of such friction wedges are subject to limitations. For example, under circumstances of relatively large lateral excursions of the bolster with respect to the side frames and where the friction wedge is disposed in a manner that there is no lateral constraint adjacent the transverse sides thereof, there may be a period after friction is broken between the wedge and bearing surface therefor, of relatively free lateral movement. This free movement of the wedge can result in impact at the bolster gib which may cause additional response severity particularly in rocking loaded cars as well as in hunting empty cars. On the other hand, if the friction wedges are constantly restrained by rigid lateral limits, the resistance to lateral movement of the side frame with respect to the bolster may be overly restrictive thus losing the general advantages of a three-piece truck in tracking around curves and on uneven track.

The present invention maintains all of the advantages described hereinabove with respect to the prior elastomeric friction members but provides additional advantages of more controlled lateral restraint in substantially all conditions of operations of three-piece railway vehicles. These advantages are obtained through the use of a pair of laterally adjacent elastomeric friction wedge portions which each engage a respective sloping wear plate surface. With such an arrangement, during lateral movement of a side frame with respect to the bolster, the lateral force on one of the wedge portion increases while the force on the other wedge portion is reduced. Furthermore, once friction is broken between the resisting wedge portions and the wear plate, the sloping surface of the wear plate permits the lateral sliding of the wedge portion while simultaneously providing a transverse wedging action to create a controlled resisting force to oppose the external lateral forces. This controlled lateral resisting force increases in proportion to the compression modulus of the material and the slope of the wear plate. Furthermore, by providing even more controlled lateral restraint, the invention herein still further increases the range of choices for the composition of side bearing elastomeric bearing blocks and additionally increases the circumstances under which elastomeric bearing blocks at the side bearing may no longer be required.

Accordingly, it is one object of this invention to provide a bolster to side frame friction assembly which better insures a flexible bolster to side frame fit-up along with smooth transition and vertical damping characteristics as well as providing superior hunting control.

Another object of this invention is to provide a side frame to bolster elastomeric friction assembly which, in addition to serving heretofore "normal" functions of a friction member, also substantially raises the threshold hunting speed of a railway truck assembly.

These and other objects and advantages of the present invention will become more readily apparent upon a reading of the following description and drawings in which.

Figure 1:
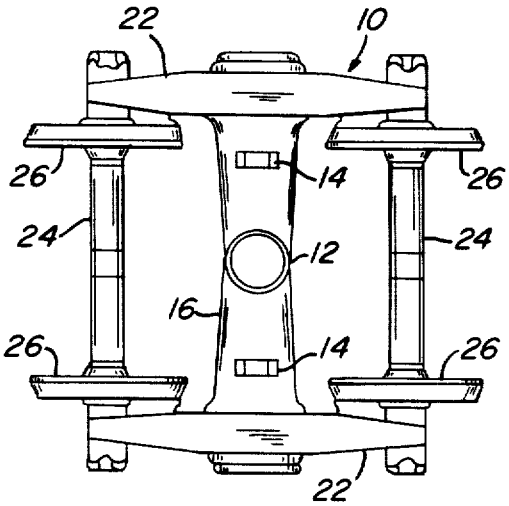
FIG. 1 is a schematic plan view of a conventional railway truck assembly of a type which will incorporate an elastomeric friction wedge assembly of the present invention therein.
Figure 3:
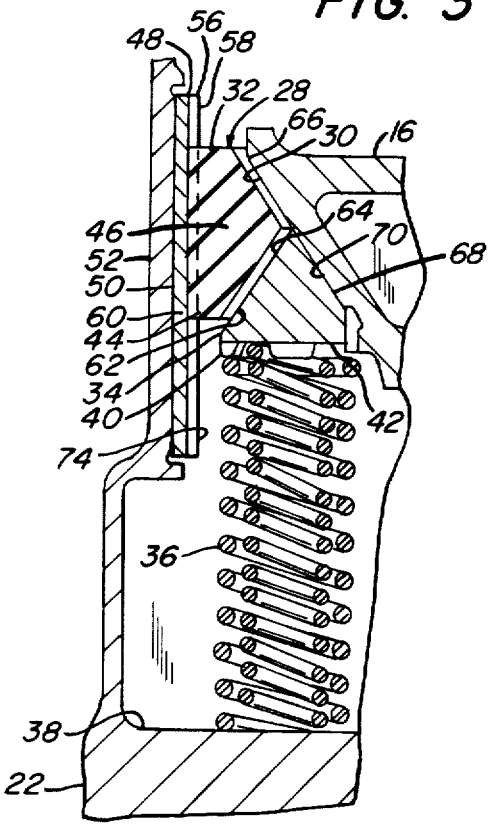
FIG. 3 is an enlarged partial side elevational view of a friction wedge assembly of the present invention in operational position on a conventional railway truck assembly.

FIGS. 1 and 3 illustrate a standard four-wheel railway freight truck of a conventional design which is generally indicated at 10 and which comprises: bolster 16 extending transversely between a pair of laterally spaced side frames 22; spring groups 20 seated on each side frame 22 to support the bolster 16; and a centerplate 12 and suitable side bearings 14 which cooperate with the bolster 16 to support a car body (not shown). A pair of spaced axle assemblies 24 having suitably journaled wheels 26 thereon extend in a direction generally parallel to the longitudinal extent of bolster 16 and support each side frame 22 adjacent respective axial end portions thereof and cooperate with a spaced pair of rails (not shown) for the rolling movement of the truck 10 therealong.

Figure 2:
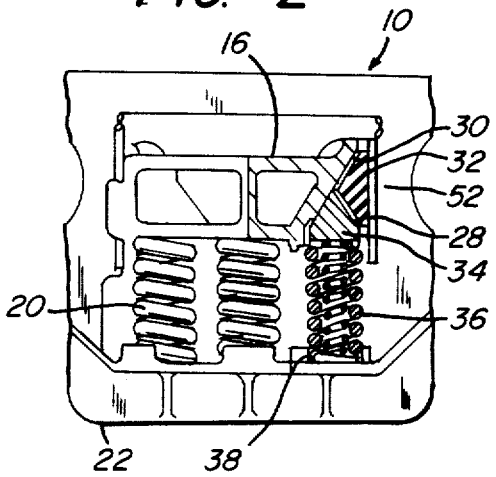
FIG. 2 is a fragmentary side elevational view, partially in section, of a bolster and side frame of a typical railway truck assembly which includes therein a friction wedge assembly of the present invention.
Figure 4:
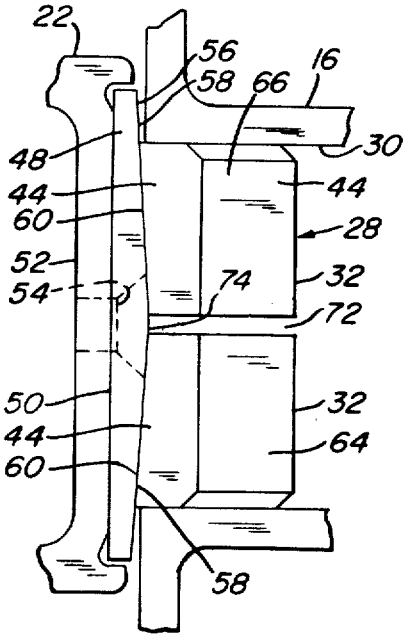
FIG. 4 is an enlarged plan view of the elastomeric portions of the wedge assembly in FIG. 3 in operational position adjacent the sloping ear plate therefor.

An elastomeric friction wedge assembly 28 of the present invention is disposed within a pocket 30 formed in an axial end portion of the bolster 16. The embodiment of assembly 28 which is illustrated in FIGS. 2 thru 4 is of a configuration which is adapted to be insertable within the bolster pocket 30 to replace prior art rigid friction wedges without the need to alter the standard configuration of existing bolsters 16 and side frame 22 of a conventional freight car truck 10.

At this point it is to be noted that the invention herein is primarily directed to an improvement over the rigid bolster to side frame friction wedges utilized heretofore and the operation and cooperation of such an improved arrangement with generally well known railway freight car components. Accordingly, other than is necessary to describe the preferred embodiment of the invention herein with respect to the bolster and side frame relationship, the balance of the elements specified hereinabove need not be described in detail for a whole and complete understanding of this invention to those skilled in the art. Furthermore, for purposes of description hereinafter *with reference to the axial extent of bolster 16*, inner or inwardly and outer or outwardly shall refer respectively to towards and away from the center-plate 12 along the longitudinal axis of bolster 16 and upper and lower or upwardly and downwardly shall refer respectively to towards and away from the top of bolster 16 as viewed in FIGS. 2 and 3.

Friction wedge 28 comprises: a pair of identical laterally adjacent elastomeric friction members 32 and a spring follower member 34 which is biased into engagement with members 32 by means of a coil unit 36 which extends vertically between an upwardly facing lower surface 28 of side frame 22 and a downwardly facing lower surface 40 of follower member 34. Follower member 34 has a generally upwardly extending triangular configuration and includes a downwardly open keeper pocket 42 formed within surface 40 for the captive retention of the uppermost end of coil unit 36. As viewed in FIGS. 3 and 4, each friction member 32 comprises an outer generally rectangularly shaped portion 44 and in inwardly projecting formed triangular portion 46.

Friction wedge assembly 28 additionally includes a wear plate 48 having the outer generally vertically extending planar surface 50 thereof abutting an adjacent column guide 52 of a respective side frame 22. Wear plate 48 is secured to the column guide 52 in any suitable manner such as by welding or by a rivet (not shown) extending through an aligned countersunk bore 54. As is best illustrated in FIG. 4, the inner generally vertically extending surface 56 of wear plate 48 consists of a pair of transversely adjacent sloped surface portions 58 which slope transversely outwardly from the transverse mid-point of the wear plate 48. The vertically extending outermost surface 60 of each portion 44 of the friction members 32 also slopes transversely outwardly at an angle such that when wedge assembly 28 is in the assembled position thereof as illustrated in FIG. 3, surface 60 will fully engage the adjacent surface portion 58 of the wear plate 48. It is to be additionally noted that the transverse dimension of the friction members 32 is such that, as is best illustrated in FIG. 4, when wedge assembly 28 is operatively positioned within a railway freight truck 10, a space 72 exists between the adjacent transversely facing surfaces of the members 32.

With a general configuration as described above, when friction assembly 28 is biased into the operational position thereof by coil unit 36, the outer vertically extending transversely sloped surface 60 of each friction member 32 will be in biased engagement with the adjacent vertically extending transversely sloped surface portion 58 of the column guide wear plate 48 and the lower surfaces 62 of the triangular portions 46 will be in engagement with a complementary sloping surface 64 of follower member 34. Furthermore, the upper sloping surfaces 66 of the triangular portions 46 will be aligned in a common sloping plane with the inner sloping surface 68 of follower member 34 and the aligned surfaces 66 and 68 will be in continuous engagement with an adjacent inclined surface 70 of the bolster pocket 30. Thus, the elastomeric friction members 32 will be generally confined within the adjacent portions of the boundary surfaces 58, 70 and 64; however, the areas of portion 44 adjacent the upper and lower ends thereof will not be confined thereby allowing spaces for the members 32 to deform in response to vertical shear forces. Furthermore, the space 72 between the friction members 32 as well as the relief afforded by the outer end of the bolster pocket 30 will allow space for the members 32 to also deform in response to transversely directed shearing forces.

The confined fit of the elastomeric friction members 32 within the bolster pocket 30 provides the fit-up of the side frame 22 to bolster 16 relationship. The vertical pre-load provided by the upwardly directed biasing force of coil unit 36 imputes the vertical frictional force between the members 32 and the wear plate 48 interface which is necessary for vertical damping by the friction wedge assembly 28. This pre-load force developed by the coil unit 28 additionally dictates at least a portion of the transverse frictional force at members 32; however, in this latter regard, the wedging effect developed by compressing of the friction members 32 as they move or resile inwardly towards the longitudinal center line of the bolster 16 must also be considered.

The pre-load force yields a longitudinally extending component reflected to and generating friction at the wear plate surfaces 56. This friction force may be varied by varying the spring constant of the coil unit 32 or by varying the self-actuation angle. As the spring constant increases or the self-actuation angle decreases or becomes more acute the longitudinally extending force at the wear plate surfaces 56 increases.

The longitudinally extending force at the wear plate surfaces 56, in conjunction with the coefficient of friction between the surfaces 56 and 60, determines the amount of external vertical and/or transverse force necessary to break friction between the wear plate 48 and the elastomeric friction members 32. Inasmuch as the damping from the vertical friction force to aid in the prevention of excessive rocking or bouncing of the railway freight car is dependent upon the biasing force of the friction assembly 28, it is important that the predetermined force necessary to break friction not be so great as to prevent substantially all vertical movement of the bolster 16. Similarily, such predetermined force must not be so small as to provide an insignificant vertical damping effect. Furthermore, such predetermined frictional force must not be so great as to prevent substantially all transverse movement of the bolster 16 with respect to the side frame 22 or to be so insignificant as to provide no substantial transverse damping force.

The vertical damping of the wedge assembly 28 of this invention is essentially identical to the vertical damping described in my hereinbefore mentioned [co-pending U.S. Patent application Ser. No. 953,012] *U.S. Pat. No. 4,230,047*. More specifically, upon initial movement of the bolster 16 with respect to the side frames 22, the elastomeric friction members 32 deform vertically. After this initial vertical deformation, portions of the friction members 32 will continue deforming while other portions will slip with respect to the adjacent wear plate 48. Finally, friction will be entirely broken and the entire surfaces 60 of friction members 32 will slip vertically with respect to the mating surfaces 56 of wear plate 48. Thus, the transition of friction members 32 from stationary to vertical sliding is extremely smooth and not at all like the abrupt "stick-slip" action of prior art rigid friction wedges. Furthermore, during the entire transition from preliminary partial deformation, deformation and partial sliding and complete sliding, the vertical motion of the bolster 16 with respect to the side frames 22 is [resisted] *influenced* by vertical bolster spring forces, including the coil units 36, and the damping or friction forces that occur during rocking or vertical bouncing. Still further, the physical properties of the elastomeric material of friction members 32 are such that the members 32 will not cause excessive wear, abrading or [gulling] *galling* of the mating metallic surfaces.

Thus, for vertical restraint the invention herein will perform substantially identically to the elastomeric friction wedge assembly discussed in the hereinbefore mentioned U.S. Patent application Ser. No. 953,012. However, the configuration of the elastomeric friction wedge assembly 28 of the present invention provides superior controlled bolster to side frame lateral restraint from such aforesaid patent application. The invention herein increases the threshold hunting speed and reduces the lateral bolster gib impact for both rocking and hunting control. Insofar as hunting control, the operation of the friction assembly 28 and the lateral deformation characteristics of the elastomeric friction members 32 will be similar to the general operation and deformation characteristics described heretofore with respect to the elastomeric bearing blocks in the side bearings 14 as are discussed in U.S. Pat. Nos. 3,957,318 and 4,090,750. The primary distinction between such patents and the present invention is that in such patents the elastomeric side bearing blocks inhibit hunting by restraining the movement of the truck body with respect to the car body [wherein] *whereas* in the present invention, the elastomeric friction members 32 act to control hunting by adding more restraint to the transverse or horizontal movement of the bolster 16 with respect to the side frames 22.

Specifically, the transversely sloping surface portions 58 of the wear plate 48, in conjunction with the surfaces 64 and 70 which act to confine the adjacent inner surfaces of the friction members 32, provide a wedging effect as the friction members 32 are urged transversely towards the vertically extending transverse juncture 74 of the surface portions 58. Accordingly, as a transverse force is applied at the wedge assembly 28, the friction member 32 adjacent the applied force will provide an initial deformation constant to resist the transverse force. The other elastomeric friction member 32 does not participate in the lateral direction and, in fact, the transverse deformation constant thereof is actually relieved. Thus, the elastomeric friction members 32 aid in the prevention of hunting by individually providing a sufficiently rigid shearing constraint within a predetermined acceptable modulus of elasticity while still providing the ability of the members 32 to insure the desired side frame to bolster fit-up effect and the vertical damping as discussed hereinbefore. Furthermore, the transverse wedging effect provided by the inclined surface portions 58 permits transverse movement to occur between the active friction member 32 and the adjacent surface portion 58 without an appreciable "flattening out" effect insofar as the transverse force resisting characteristics of the active friction member 32. This latter characteristic is realized because, as the active member 32 moves transversely towards the juncture 74, the member 32 is further compressed because of the hereinabove mentioned transverse wedging effect between adjacent confining surfaces therefor. This further compression applies an even greater normal force to the surface portion 58 and results in an increase of friction at surface portion 58 and the active elastomeric friction member 32.

If the sloped surface 58 were not provided, the adjacent surfaces of portion 58 and friction member 32 would merely be in wiping contact during the transverse movement of the friction member 32 and, thus, the transverse force-deflection curve for the friction member 32 would not increase during such transverse movement. Hence, the inclusion of the sloping surface portion 58 provides a superior wider range hunting control over heretofore conceived elastomeric friction wedge arrangements while still allowing for the fit-up and translation requirements of three-piece railway freight trucks 10. Furthermore, because of the above discussed operating characteristics of the wedge assembly 28 of the present invention, a substantially wider range of materials is available for the composition of the friction members 32. Thus, in addition to wide range operating characteristics for the members 32 themselves, the invention herein may foretell, in certain instances, that elastomeric side bearing blocks such as illustrated in U.S. Pat. Nos. 3,957,318 and 4,090,750, may no longer be required for adequate hunting control or, in the least, the range of materials for such side bearing blocks will certainly be wider or, the operational requirements thereof may be substantially lessened.

Figure 5:
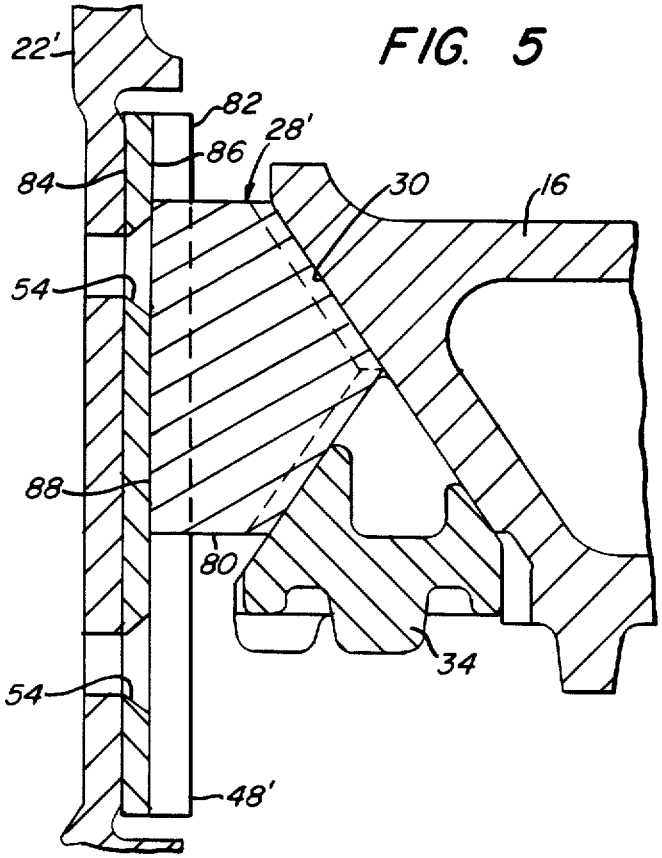
FIG. 5 is an enlarged partial side elevational view of another embodiment of a friction wedge assembly of the present invention taken on lines 5—5 of FIG. 6.
Figure 6:
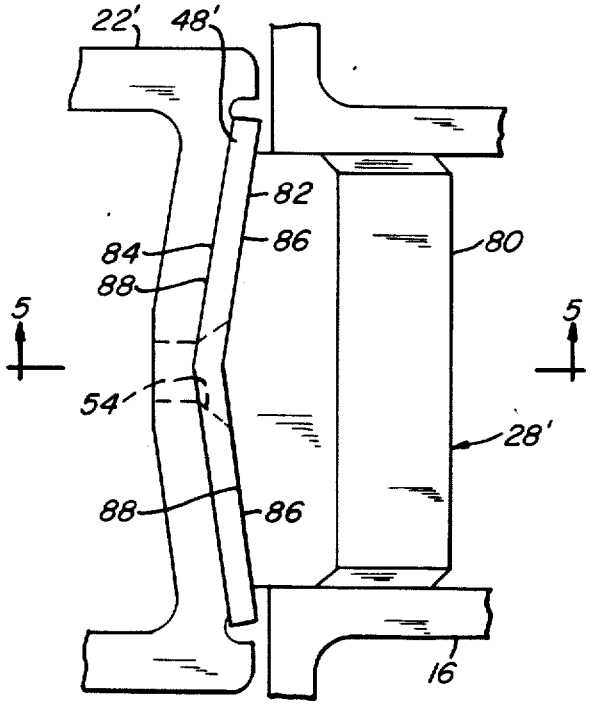
FIG. 6 is a plan view of the elastomeric portions of the wedge assembly in FIG. 5 in operational position adjacent the sloping wear plate therefor.

FIGS. 5 and 6 illustrate another embodiment of an elastomeric friction wedge assembly 28' which is constructed in accordance with the principles of the present invention. Assembly 28' is generally similar in construction and operation to the friction assembly 28 discussed hereinbefore with the primary distinctions therebetween being twofold. First, the friction assembly 28' comprises a single elastomeric friction member 80 and secondly the relative orientation of the slopes of the adjacent surfaces of friction member 80 and the wear plate 48' are generally reversed from the corresponding orientation of the adjacent surfaces of the friction members 32 and wear plate 48 of the hereinbefore discussed friction wedge assembly 28. In view of the similarity between assemblies 28 and 28', elements of assembly 28' which are essentially identical to like elements of assembly 28 will be identified with identical reference numerals and similar elements will be identified with identical reference numerals primed.

Wear plate 48' includes inner and outer generally vertically extending surfaces 82 and 84, respectively, each of which consists of a pair of transversely adjacent sloped surface portions 86 which slope transversely inwardly from the transverse midpoint of the wear plate 48'. Elastomeric friction member 80 additionally includes a pair of transversely adjacent outer surfaces 88 thereof which slope transversely inwardly from the transverse midpoint thereof such that when wedge assembly 28' is in the assembled position thereof as illustrated in FIG. 5, surfaces 88 of member 80 engage the adjacent surface portions 86 of wear plate 48'. In the embodiment illustrated, the column guide 52' of the respective side frame 22' therefor is formed to complement the configuration of the outer surface 84 of wear plate 48'.

With a configuration of wedge assembly 28' as discussed hereinabove, the assembly, structural cooperation and operation thereof is essentially identical to the assembly, structural cooperation and operation of wedge assembly 28 as discussed hereinbefore. However, because of the reversal of the slope of cooperating surfaces between wear plate 48' and friction member 80, the lateral restraint offered by the wedging effect of friction member 80 occurs at the transverse side of member 80 opposite from the direction of the transverse load imparted thereto. An additional factor to be considered with the utilization of wedge assembly 28' is that because assembly 28' does not include a space 72, the selection of the elastomeric material for member 80 may be somewhat limited in comparison with the available material range for the friction members 32. Such a limitation occurs because it is essential that the member 80 does not provide excessive lateral restraint or inhibition to transverse movement of the bolster 16 with respect to the side frame 22'.

The invention herein is primarily directed to a side frame to bolster friction assembly having elastomeric friction means which undergo compression during the transverse movement thereof. Accordingly, various changes can be made by those skilled in the art to the embodiment described hereinabove without departing from the scope of the invention herein, which is defined by the scope of the claims hereinafter. For example: the sloped orientations between the wear plate 48 and members 32 and also between the wear plate 48' and member 48 may be reversed from the specific orientations illustrated; the elastomeric friction members 32 and 80 may be formed with one or more differing layers of elastomer if conditions so dictate; the surfaces of wear plate 48 and 48' may be lubricated for initial break-in, if desired; hydraulic snubbers can be disposed in the spring groups 20 to aid in the control of rocking or swaying of the railway freight truck 10; and the like.

What is claimed is:

1. A railway truck bolster friction assembly adapted to be captively retained within a pocket of an elongated truck bolster member which extends between spaced elongated side frame members of a railway truck vehicle comprising: elastomeric friction means adapted to have a first portion thereof in [communication] *engagement* with adjacent surfaces of such a pocket and a second portion thereof in *biased* frictional engagement with adjacent portions of [wearing] *wear* surface means of a column guide of a respective one of said side frames, said second portion being spaced [longitudinally outwardly, with respect to] *outwardly of such a pocket from* the [longitudinal] axis of such a bolster member, [from such a pocket] and said first portion being spaced [longitudinally] inwardly from said second portion; *bias means cooperable with said elastomeric friction means to maintain such frictional engagement;* said [elastomeric] friction means being operative to deform [and maintain said frictional engagement], without slipping between adjacent engaging surfaces, during at least initial vertical and transverse movements of such a bolster member with respect to such a respective one of said side frame members; during a subsequent transverse movement of such a bolster member with respect to such a side frame member, at least a section of said [section] *second* portion slips transversely with respect to the adjacent portion of said [wearing] *wear* surface means; and during such transverse slipping, said adjacent portion of said [wearing] *wear* surface means cooperates with such a pocket to continuously increase the friction between said section of said second portion and said adjacent portion of said [wearing] *wear* surface means in direct proportion to the amount of said subsequent transverse movement.

2. A railway truck bolster friction assembly as specified in claim 1 additionally including biasing means to bias said elastomeric friction means into said communication and said frictional engagement.

3. A railway truck bolster friction assembly as specified in claim 2 wherein during a subsequent vertical movement of such a bolster member, said elastomeric friction means are operative such that at least sections of said second portion will slip with respect to adjacent portions of said wearing surface means.

4. A railway truck bolster friction assembly as specified in claim 2 wherein said adjacent portion of said wearing surface means slopes transversely outwardly from a generally vertically extending longitudinally innermost surface of said wearing surface means.

5. A railway truck bolster friction assembly as specified in claim 4 wherein said wearing surface means includes a pair of said adjacent portions, each of said adjacent portions slope transversely outwardly from said innermost surface and a respective section of said elastomeric friction means frictionally engages each of said adjacent portions.

6. A railway truck bolster friction assembly as specified in claim 5 wherein said adjacent portions are identical and said innermost portion is transversely equidistant from the transverse edges of said wearing surface means.

7. A railway truck bolster friction assembly as specified in claim 6 wherein during said [second] *subsequent* transverse movement in one direction only the friction between one of said sections of said second portions and said [second] adjacent portion of said wearing surface *means* adjacent thereto increases and during said [second] *subsequent* transverse movement in a direction opposite said one direction only the friction between the other of said sections of said second portion and the other of said adjacent portion of said wearing surface increases.

8. A railway truck bolster friction assembly as specified in claim 7 wherein said elastomeric friction means comprises a pair of transversely adjacent, identical elastomeric friction members.

9. A railway truck bolster friction assembly as specified in claim 8 wherein when said friction members are in operational position within such a pocket, the transversely adjacent surfaces thereof are transversely spaced from each other.

10. A railway truck bolster friction assembly as specified in claim 9 wherein said biasing means continuously biases each of said elastomeric friction members into said communication and said frictional engagement.

*11. In a friction assembly adapted for use in a railway truck intermediate a longitudinal end portion of an elongated truck bolster and an adjacent column guide portion of a truck side frame to provide frictional damping of*

*relative vertical and lateral motion between the bolster and the side frame, the combination comprising:*

*a friction element adapted to be retained with respect to such a longitudinal end portion of such a bolster;*

*a wear surface means adapted to be retained with respect to such an adjacent column guide portion of such a side frame;*

*bias means operable to maintain frictional engagement between said friction element and said wear surface means throughout such relative motion between such a bolster and such a side frame;*

*said friction element being relatively movable in opposite lateral directions with respect to said wear surface means while in frictional engagement therewith during such relative motion between such a bolster and such a side frame;*

*and said wear surface means and adjacent portions of said friction element being configured to continuously increase the magnitude of friction between said wear surface means and at least a portion of said friction element during relative lateral motion therebetween throughout a range of such lateral motion in either of such opposite lateral directions.*

*12. The combination as claimed in claim 11 wherein said increase in the magnitude of friction between said wear surface means and said at least a portion of said friction element is directly proportional to the magnitude of such relative lateral motion.*

*13. The combination as claimed in claim 12 wherein said friction element includes a resiliently deformable means which is initially deformed in response to the bias of said bias means.*

*14. The combination as claimed in claim 13 wherein said resiliently deformable means includes a surface portion thereof which is mantained in frictional engagement with said wear surface means.*

*15. The combination as claimed in claim 14 wherein said resiliently deformable means is further deformed beyond said initial deformation in response to such relative motion.*

*16. The combination as claimed in claim 15 wherein said friction element is retained with respect to an end portion of such a bolster in an outwardly open pocket.*

*17. The combination as claimed in claim 16 wherein said at least a portion of said friction element is a pair of portions thereof and the magnitude of friction between said wear surface means and said friction element is increased during such relative lateral motion by increasing the magnitude of friction with respect to a respective one of said pair of portions during such relative lateral motion in respective opposite lateral directions.*

*18. The combination as claimed in claim 11 wherein said wear surface means and said adjacent portions of said friction element are mutually engageable in frictional engagement along respective adjacent surface portions thereof to provide such frictional damping of such relative vertical and lateral motion and said respective surface portions are configured to continuously increase the magnitude of friction between said wear surface means and said at least a portion of said friction element during such relative lateral motion therebetween.*

* * * * *

UNITED STATES PATENT OFFICE

CERTIFICATE OF CORRECTION

Patent No. Re. 31,988 Dated September 24, 1985

Inventor(s) Donald Wiebe

It is certified that error appears in the above-identified patent and that said Letters Patent are hereby corrected as shown below:

Column 2, Line 14, the bracketed material should be "This copending application."

Column 2, Line 26, the word "sliding" in italics should appear before "friction."

Column 9, Line 60, the brackets around "longitudinal" should be deleted.

Column 9, Line 65, the brackets around "elastomeric" should be deleted.

Column 12, Line 5, delete "mantained" and substitute --maintained--.

Signed and Sealed this

Tenth Day of December 1985

[SEAL]

Attest:

DONALD J. QUIGG

Attesting Officer

Commissioner of Patents and Trademarks